(12) United States Patent
Nara

(10) Patent No.: US 7,161,626 B1
(45) Date of Patent: Jan. 9, 2007

(54) IMAGE READING APPARATUS

(75) Inventor: Wataru Nara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/411,629

(22) Filed: Oct. 1, 1999

(30) Foreign Application Priority Data

Oct. 2, 1998 (JP) ................ 10-296061

(51) Int. Cl.
H04N 9/64 (2006.01)
H04N 1/40 (2006.01)
H04N 1/38 (2006.01)

(52) U.S. Cl. ............ 348/243; 348/251; 358/461; 358/463

(58) Field of Classification Search ........... 348/243, 348/251, 222.1, 223.1, 241, 248; 358/446–448, 358/461, 464, 463; 382/254, 274
See application file for complete search history.

(56) References Cited

U.S. PATENT DOCUMENTS

| | | | | |
|---|---|---|---|---|
| 4,231,065 A | * | 10/1980 | Fitch et al. | 348/28 |
| 4,806,780 A | * | 2/1989 | Yamamoto et al. | 348/251 |
| 4,922,335 A | * | 5/1990 | Outa et al. | 358/461 |
| 5,181,118 A | * | 1/1993 | Kimura | 348/243 |
| 5,189,528 A | * | 2/1993 | Takashima et al. | 358/448 |
| 5,253,083 A | * | 10/1993 | Hirota | 358/461 |
| 5,548,332 A | * | 8/1996 | Topper et al. | 348/251 |
| 5,644,409 A | * | 7/1997 | Irie et al. | 382/274 |
| 5,659,355 A | * | 8/1997 | Barron et al. | 348/243 |
| 5,926,570 A | * | 7/1999 | Smitt | 358/464 |
| 5,930,401 A | * | 7/1999 | Morishige et al. | 382/274 |
| 6,028,957 A | * | 2/2000 | Katori et al. | 382/162 |
| 6,157,407 A | * | 12/2000 | Kobayashi | 348/241 |
| 6,304,292 B1 | * | 10/2001 | Ide et al. | 348/243 |
| 6,750,910 B1 | * | 6/2004 | Bilhan | 348/243 |
| 6,791,607 B1 | * | 9/2004 | Bilhan et al. | 348/243 |

FOREIGN PATENT DOCUMENTS

| | | |
|---|---|---|
| JP | 5-14711 | 1/1993 |
| JP | 5-268474 | 10/1993 |
| JP | 7-212587 | 8/1995 |
| JP | 09-247437 | 9/1997 |
| JP | 09-331420 | 12/1997 |

OTHER PUBLICATIONS

U.S. Appl. No. 09/411,629, filed Oct. 1, 1999.
U.S. Appl. No. 09/662,173, filed Sep. 14, 2000.
U.S. Appl. No. 10/612,933, filed Jul. 7, 2003, Ando et al.

* cited by examiner

Primary Examiner—David Ometz
Assistant Examiner—Nhan T. Tran
(74) Attorney, Agent, or Firm—Oblon, Spivak, McClelland, Maier & Neustadt, P.C.

(57) ABSTRACT

A CCD photoelectrically converts image information obtained from optically reading an original image, line by line, and outputs an image signal. Several of the photoelectric sensors of a CCD of the CCD portion form an optical black portion. A black shading correcting portion corrects the image signal using a black reference level. The black reference level is obtained from the optical black portion of the CCD for each line during an operation of the reading of the original image. The black reference level used by said black shading correcting portion for each line is obtained using black reference values, each of the black reference values being data of the optical black portion for a respective one of a plurality of lines.

10 Claims, 6 Drawing Sheets

IMAGE READING APPARATUS

BACKGROUND OF THE INVENTION

1. Field of the Invention

The present invention relates to an image reading apparatus which uses a photoelectric device such as a charge-coupled device (CCD) or the like, and generates an image signal from an original image, and, in particular, to an image reading apparatus which performs correction, using data of a black reference level, on image data obtained from the original image through the photoelectric device.

2. Description of the Related Art

An image reading apparatus in the related art, which apparatus uses a photoelectric device such as a charge-coupled device (CCD) or the like, and generates an electric image signal from an original image, performs a correction, using data of a black reference level, on image data obtained from the original image through the photoelectric device. The method thereof will now be described.

Generally speaking, an image signal outputted from a CCD includes a signal component due to a dark current which does not change due to change in an amount of light received by the CCD, and a signal component which changes in accordance with the change in the amount of light received by the CCD. A signal component which is effective for image processing is only the signal component which changes in accordance with the change in the amount of light received by the CCD. Accordingly, in order to obtain the signal component which is to be outputted to a following image processing circuit, it is necessary to perform the correction (black shading correction) to subtract the data of the signal component due to the dark current from the data of the image signal outputted from the CCD.

The signal component due to the dark current can be obtained as a result of outputs of an optical black (OPB) portion provided as part of a line of photoelectric sensors of the CCD (scan beginning part in a main scan direction, as shown in FIG. 1) being averaged, before the CCD reads the original image, for each line, for example. The OPB portion provided as the part of the line of the photoelectric sensors of the CCD is obtained as follows: Aluminum deposition is performed on several (for example, eight, sixteen, or the like) photoelectric sensors of the line of the (for example, thousands of) photoelectric sensors of the CCD, each photoelectric sensor corresponding to a pixel, which several photoelectric sensors are arranged at the end at which scanning in the main scan direction begins. Thereby, these several photoelectric sensors of the CCD are covered by the aluminum film, and, as a result, are shielded from light, and, thus, no light is received by these several photoelectric sensors of the CCD. Thereby, the data of the black reference level can be obtained using the data obtained from the several photoelectric sensors of the OPB portion of the CCD.

FIG. 2 is a block diagram showing essential portions of one example of an image reading apparatus including a black shading correction portion for performing the above-mentioned correction (black shading correction) in the related art.

The image reading apparatus shown in FIG. 2 includes a CCD portion 1 which comprises a CCD including a line of photoelectric sensors extending in the main scan direction, and generates an image signal from an original image as a result of reading the original image. The reading of the original image is performed as follows: The CCD portion 1 scans a first line of the original image in the main scan direction along the line of the photoelectric sensors of the CCD (whereby image data of the first line is obtained) and scans the original image in the sub-scan direction (perpendicular to the main scan direction) by sequentially scanning subsequent lines of the original image (whereby image data of respective lines, i.e., a second line, a third line, . . . , an n-th line, is obtained in sequence). The CCD of the CCD portion 1 is the same as the above-described CCD having the OPB portion. The image reading apparatus further includes a signal processing portion 2 which performs processing of an analog image signal outputted from the CCD portion 1, an A-D converting portion 3 which is an A-D converter converting the analog image signal into a digital image signal, a peak hold (P/H) portion 4 for detecting a background level of the original image, a black shading correction portion 5 which performs the correction, using the data of the black reference level, on the image signal, and a white shading correction portion 6 which performs white shading correction on the image signal. Further, the black shading correction portion 5 includes an average-value calculating circuit 7 which calculates the average of the outputs of the CCD portion 1 during the period during which the CCD portion 1 obtains data (to be used for obtaining the black reference level) through the photoelectric sensors of the above-mentioned OPB portion of the CCD, and a subtracter 8 which subtracts the average calculated by the average-value calculating circuit from the data of the image signal obtained from the original image.

In FIG. 2, the image analog signal outputted by the CCD portion 1 undergoes signal processing through the signal processing portion 2, and, then, is converted into the digital image signal by the A-D converting portion 3. The digital image signal outputted from the A-D converting portion 3 is inputted to the black shading correction portion 5, undergoes the black shading correction therethrough, and, then, is outputted. The image signal outputted from the black shading correction portion 5 is inputted to the white shading correction portion 6. The white shading correction portion 6 performs the white shading correction on the data of the thus-inputted image signal using white reference data which was obtained using a white reference plate or the like. Then, the image signal is inputted to an image processing block (not shown in the figure).

In the black shading correction portion 5, the average calculating circuit 7 calculates the average of the outputs from the OPB portion in the CCD portion 1 as the data of the reference black level at the beginning of reading of an original image for each line, and outputs the thus-calculated average Dopb (the average of the pixel values (of the OPB portion) in the main scan direction). The subtracter 8, which has received the average Dopb, subtracts the average Dopb from the data D0 of the image signal (outputted from the A-D converting portion 3 when the original image is read), and outputs the thus-obtained data to the white shading correction portion 6. Thus, the black shading correction portion 5 averages the data outputted from the OPB portion of the CCD portion 1 for each line, and, thereby, obtains the data of the black reference level to be used for the black shading correction to eliminate the black offset from the image signal. The calculation of the average performed by the average calculating circuit 7 is performed only during the period during which the average calculating circuit receives an OPBGATE signal, which is provided to the average calculating circuit 7 only during the period during which data obtained from the OPB portion in the CCD portion 1 is outputted from the CCD portion 1.

As shown in FIG. 2, the peak hold (P/H) portion 4 is connected between the signal processing portion 2 and the A-D converting portion 3. The peak hold portion 4 holds the peak value of the output from the signal processing portion 2, and provides the peak value to the A-D converting portion 3 as the reference voltage of the A-D converting portion 3. Thus, the peak hold portion 4 detects the color level of the background of the original image, and provides the thus-detected level to the A-D converting portion 3 as the reference voltage. Thereby, the influence of the color of the background of the original image on the image signal outputted from the A-D converting portion 3 is eliminated.

The peak value of the image signal varies due to variation in the color of the background of the original image. In many cases, the original image read by the image reading apparatus is an image printed on a paper sheet. In such a case, the above-mentioned color of the background of the original image is the color of this paper sheet. The color of the paper sheet on which the original image was printed is ordinarily white. However, there is a case where the color of the paper sheet on which the original image was printed is not white, but is red, for example. Therefore, the peak value of the image signal varies as the color of the paper sheet on which the original image was printed varies. As a result, the output of the peak hold portion 4 varies, and, accordingly, the reference voltage of the A-D converting portion 3 varies. Thereby, the output from the A-D converting portion 3 varies. As a result, the level of the black offset which should be eliminated from the image signal through the black shading correction performed by the black shading correction portion 5 varies. Therefore, the black shading correction to eliminate the black offset from the image signal performed by the black shading portion 5 should be performed at the same time (in real time) the image signal obtained when the background of the original image is read is processed.

However, the number of the photoelectric sensors of the CCD which can be used as the OPB portion is limited, because almost all of the photoelectric sensors are used for reading the original image and the photoelectric sensors used as the OPB portion cannot be used for reading the original image. Therefore, when the signal-to-noise ratio (S/N ratio) of the image reading apparatus is bad, variation in the average of the outputs of the photoelectric sensors of the OPB portion occurs due to the noise. Thereby, the black reference level used for the black shading correction may vary for each line due to the noise. When the black reference level varies for each line due to the noise, the following situation occurs: Although the black offset level of the original image does not vary or varies smoothly in the sub-scan direction, a pattern of lateral stripes develops in the image represented by the image signal, because the black reference level used for the black shading correction varies for each line due to the noise, and, thereby, the level of the image signal obtained through the black shading correction varies for each line.

SUMMARY OF THE INVENTION

The present invention has been devised in order to solve the above-described problem, and an object of the present invention is to provide an image reading apparatus by which the black shading correction to eliminate the black offset can be performed at the same time (in real time) the image signal obtained when the background level of the original image is read is processed, and, also, variation in the average of outputs of the OPB portion for each line can be controlled.

An image reading apparatus, according to the present invention, comprises:

photoelectrically converting means for photoelectrically converting image information obtained from optically reading an original image, line by line, and outputting an image signal, the photoelectrically converting means having optically shielding means provided at a portion thereof; and black shading correction means for correcting the image signal using a black reference level, the black reference level being obtained from the portion of the photoelectrically converting means for each line during an operation of the reading of the original image, wherein the black reference level used by the black shading correction means for each line is obtained using black reference values, each of the black reference values being data of the portion of the photoelectrically converting means for a respective one of a plurality of lines.

In this arrangement, the black reference level used by said black shading correction means for each line is obtained using black reference values, each of the black reference values being data of the portion of the photoelectrically converting means for a respective one of a plurality of lines. Thereby, it is possible to control the variation in the level of the image signal for each line due to the variation in the black reference level used by the black shading correction means for each line due to noise.

The black reference level may be a weighted average of the black reference values.

Thereby, it is possible to control the variation in the level of the image signal for each line due to the variation in the black reference level used by the black shading correction means for each line due to noise, and, also, it is possible to enable the correction performed by the black shading correction means to well follow the variation in the black offset level of the image signal due to variation in the level of the image signal, for each line, by appropriately selecting the above-mentioned plurality of lines and appropriately determining the coefficient of the weighted-averaging.

The black reference value for a respective line may be an average of pixel values in a main scan direction, and the weighted average of the black reference values is obtained from weighted-averaging, in a sub-scan direction, the black reference values.

The black reference level for each line may be obtained from weighted-averaging the black reference value for the current line and the black reference level for the preceding line.

In this arrangement, it is possible to enable the correction performed by the black shading correction means to well follow the variation in the black offset level of the image signal due to variation in the level of the image signal, for each line, and, also, it is possible to reduce the size of the arrangement of the black shading correction means.

The black reference level may be a moving average of the black reference values.

In this arrangement, it is possible to simplify the arrangement of the black shading correction means.

The black reference value for a respective line may be an average of pixel values in a main scan direction, the moving average being obtained from moving-averaging, in a sub-scan direction, the black reference values.

The black reference level for each line may be obtained from moving-averaging the black reference values for the plurality of lines.

The plurality of lines may comprise the current line and preceding lines.

In this arrangement, it is possible to enable the correction performed by the black shading correction means to well follow the variation in the black offset level of the image signal due to variation in the level of the image signal, for each line.

Other objects and further features of the present invention will become more apparent from the following detailed description when read in conjunction with the accompanying drawings.

DETAILED DESCRIPTION OF THE PREFERRED EMBODIMENTS

Embodiments of the present invention will now be described.

Figure 3:
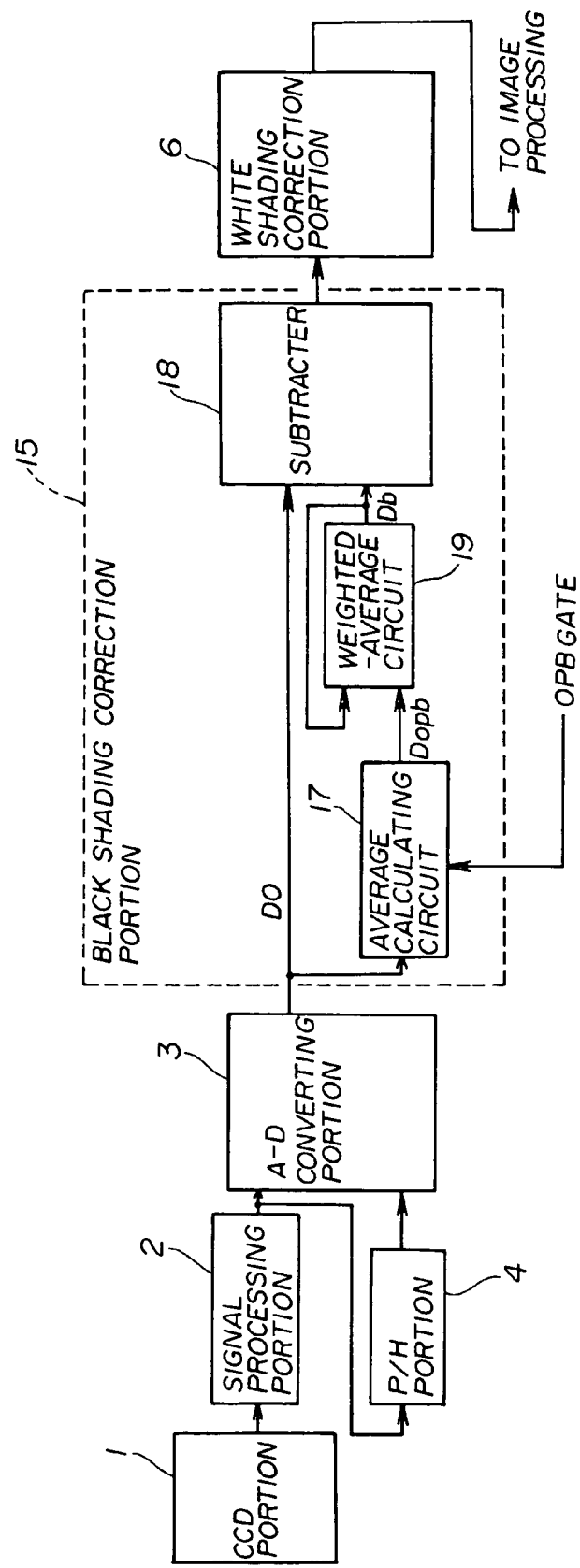
FIG. 3 is a block diagram showing essential portions of an image reading apparatus in the first embodiment of the present invention.

FIG. 3 is a block diagram showing essential portions of an image reading apparatus, in a first embodiment of the present invention, including a black shading correction portion, which performs the black shading correction.

As shown in FIG. 3, the image reading apparatus in the first embodiment includes a CCD portion 1 which comprises a CCD including a line of photoelectric sensors extending in the main scan direction, and generates an image signal as a result of reading an original image. The reading of the original image is performed as follows: The CCD portion 1 scans a first line of the original image in the main scan direction along the line of the photoelectric sensors of the CCD (whereby image data of a first line is obtained) and scans the original image in the sub-scan direction (perpendicular to the main scan direction) by sequentially scanning subsequent lines of the original image (whereby image data of respective lines, i.e., a second line, a third line, . . . , an n-th line, is obtained in sequence). The CCD of the CCD portion 1 is the same as the above-described CCD having the OPB portion. The image reading apparatus further includes a signal processing portion 2 which performs processing of an analog image signal outputted from the CCD portion 1, an A-D converting portion 3 which is an A-D converter converting the analog image signal into a digital image signal, a peak hold (P/H) portion 4 for detecting a background level of the original image, a black shading correction portion 15 which performs a black shading correction, using the data of the black reference level, on the image signal, and a white shading correction portion 6 which performs a white shading correction on the image signal.

Figure 1:
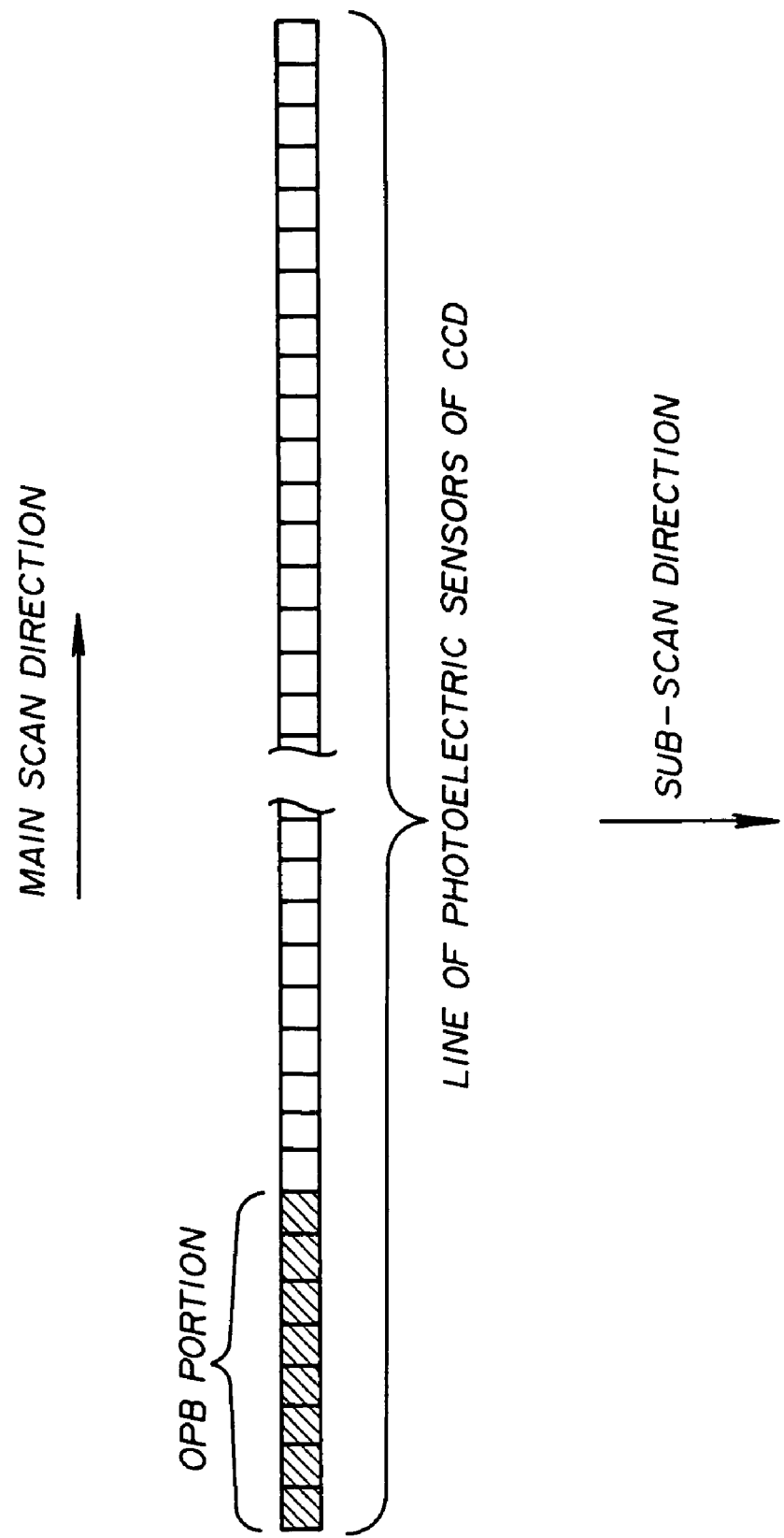
FIG. 1 shows an arrangement of photoelectric sensors of a CCD used for reading an original image in an image reading apparatus in each of the related art, and first and second embodiments of the present invention.
Figure 2:
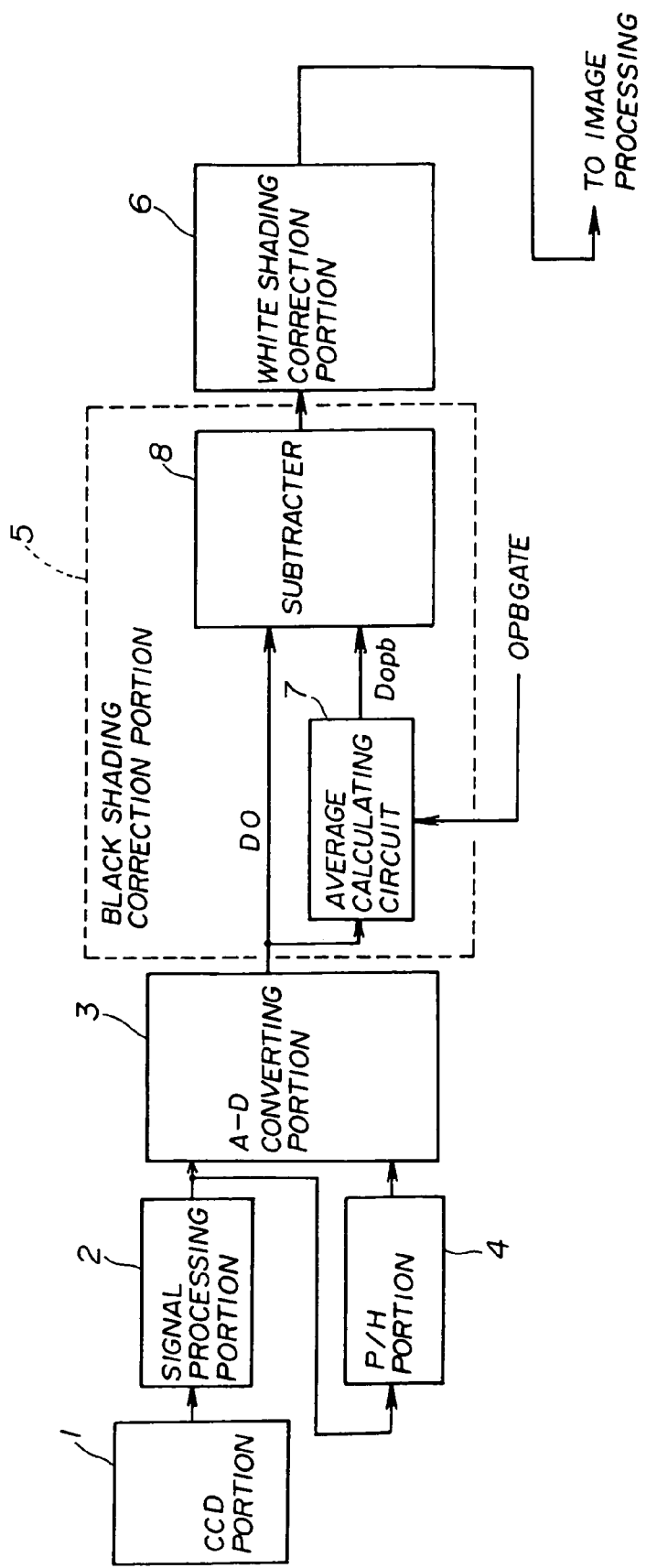
FIG. 2 is a block diagram showing essential portions of an image reading apparatus in the related art.

The arrangement of the image reading apparatus in the first embodiment is the same as the image reading apparatus in the related art shown in FIG. 2, except for the black shading correction portion 15. That is, each of the portions 1, 2, 3, 4 and 6 of the image reading apparatus in the first embodiment is the same as a respective one of the portions 1, 2, 3, 4 and 6 in the related art shown in FIG. 2.

The black shading correction portion 15 includes an average calculating circuit 17 which calculates the average of outputs of the CCD portion 1 during the period during which the CCD portion 1 outputs data obtained through the photoelectric sensors of the above-mentioned OPB portion of the CCD, a weighted-average circuit 19 which performs weighted-averaging using values outputted from the average calculating circuit 17, and a subtracter 18 which subtracts the value calculated by the weighted-average circuit 19 from the data of the image signal outputted from the A-D converting circuit 3.

In FIG. 3, the analog image signal outputted by the CCD portion 1 undergoes signal processing through the signal processing portion 2, and, then, is converted into the digital image signal by the A-D converting portion 3. The digital image signal outputted from the A-D converting portion 3 is inputted to the black shading correction portion 15, undergoes the black shading correction therethrough, and, then, is outputted. The image signal outputted from the black shading correction portion 15 is inputted to the white shading correction portion 6. The white shading correction portion 6 performs the white shading correction of the data of the thus-inputted image signal using white reference data which was obtained using a white reference plate or the like. Then, the image signal is inputted to an image processing block (not shown in the figure).

The average calculating circuit 17 of the black shading correction portion 15 obtains outputs of the OPB portion of the CCD portion 1 (from the CCD portion 1 via the signal processing portion 2 and A-D converting portion 3) before the CCD portion 1 reads the original image, for each line. Then, the average calculating circuit 17 calculates the average of these outputs, and outputs the average as Dopb. The weighted-average circuit 19, which receives the average Dopb, calculates a weighted average Db,n (data of a black reference level) using the average Dopb, and outputs the calculated weighted average Db,n to the subtracter 18. The weighted average Db,n results from a weighted-average calculation being repeated for each line from the second line to the current line, the weighted-average calculation using the average Dopb,1 for the first line through the average Dopb,n for the current line. The subtracter 18, which has received the weighted average Db,n, subtracts the weighted average Db,n from the data D0 of the image signal (outputted from the A-D converting portion 3 when the original image is read), and outputs the thus-obtained data to the white shading correction portion 6. The calculation of the average performed by the average calculating circuit 17 is performed only during the period during which the average calculating circuit 17 receives the OPBGATE signal, which is provided to the average calculating circuit 17 only during the period during which the data obtained from the OPB portion of the CCD portion 1 is outputted from the CCD portion 1.

Further, in the arrangement of the first embodiment shown in FIG. 3, as in the related art shown in FIG. 2, the peak hold (P/H) portion 4 is connected between the signal processing portion 2 and the A-D converting portion 3. The peak hold portion 4 holds the peak value of the output from the signal processing portion 2, and provides the peak value to the A-D converting portion 3 as the reference voltage of the A-D converting portion 3. Because the operation of the peak hold circuit 4 in the first embodiment is the same as the operation of the peak hold circuit 4 in the related art shown in FIG. 2, further description is omitted.

As described above, in the black shading correction portion 15 in the first embodiment, the data of the black reference level for eliminating the black offset from the image signal is obtained as a result of performing weighted-averaging using the average of the data obtained from the data outputted from the OPB portion of the CCD of the CCD portion 1 for the first line through the average of the data obtained from the data outputted from the OPB portion of the CCD of the CCD portion for the current line in sequence. In this case, the weighted average Db,n is obtained from the following equation (1), for example:

$$Db,n = Dopb,n/A + Db,n-1 \times (A-1)/A \qquad (1)$$

where:

'Db,n' represents the data of the black reference level (which is subtracted from the data D0 of the image signal through the subtracter 18) for the n-th line;

'Db,n−1' represents the data of the black reference level (which is subtracted from the data D0 of the image signal through the subtracter 18) for the (n−1)-th line;

'Dopb,n' represents the average or a weighted average of the data obtained from the data outputted from the OPB portion for the n-th line (that is, the average or a weighted average of the data of the image signal outputted from the A-D converting portion 3 during the period during which the data obtained from the OPB portion of the CCD portion 1 is outputted from the CCD portion 1 before the original image is read for the n-th line); and 'A' represents a constant (weighted-average coefficient).

However, when the image data for the first line is processed, that is, when n=1, Db,1=Dopb,1

Assuming that the S/N ratio of the image reading apparatus is bad, and, thereby, the average Dopb,n of the data obtained from the data outputted from the OPB portion for each line varies, the average Dopb,n is expressed as follows:

$$Dopb,n = Db,n-1 + \alpha \qquad (2)$$

where $\alpha$ represents the variation due to the noise.

As a result of substitution of the equation (2) in the equation (1), the following equation (3) is obtained:

$$Db,n = Db,n-1 + \alpha/A \qquad (3)$$

From the equation (3), it can be seen that, by performing the weighted-averaging as in the first embodiment of the present invention, the variation $\alpha$ due to the noise is reduced by a factor of A.

Figure 4:
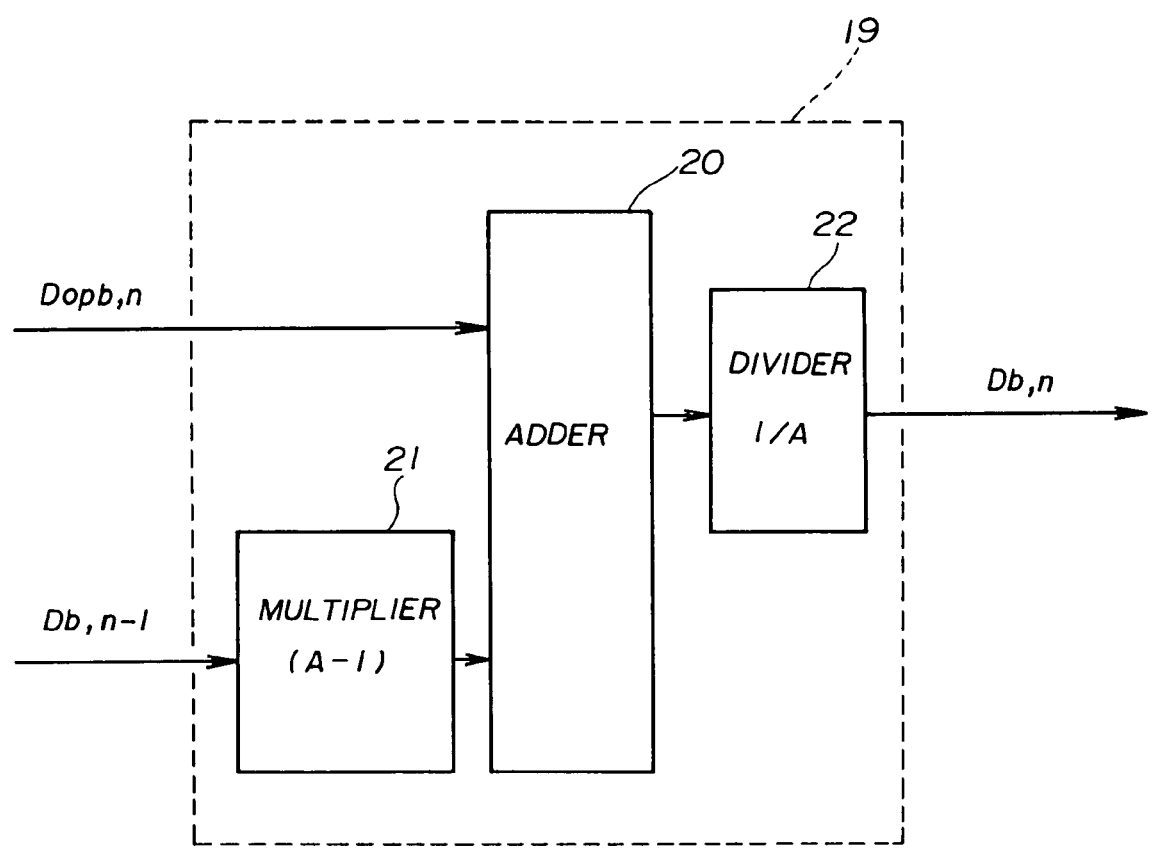
FIG. 4 is a block diagram showing an internal arrangement of a black shading correction portion shown in FIG. 3.

FIG. 4 is a block diagram showing the internal arrangement of the weighted-average circuit 19.

The weighted-average circuit 19 includes a multiplier 21 which multiplies the weighted average Db,n−1 for the preceding line, outputted from the weighted-average circuit 19, by (A−1), an adder 20 which adds the value outputted from the multiplier 21 to the average Dopb,n, provided by the average calculating circuit 17, and a divider 22 which divides the value outputted from the adder 20 by A so as to output the weighted average Db,n (the data of the black reference level which is subtracted from the data D0 of the image signal through the subtracter 18). However, when the image data for the first line is processed, that is, when n=1, the weighted-average circuit 19 outputs the inputted average Dopb,1, as it is, as the data Db,1 of the black reference level (which is subtracted from the data D0 of the image signal through the subtracter 18) for the first line.

In the arrangement shown by the block diagrams of FIGS. 3 and 4, the value obtained as a result of weighted-averaging shown in the above-mentioned equation (1) being performed is outputted to the subtracter 18. Accordingly, as shown in the above-mentioned equation (3), it is possible to reduce the variation due to the noise by the factor of A.

Thus, by using the weighted-average circuit 19, it is possible to take measures to deal with the situation that the S/N ratio of the image reading apparatus is bad, using the very simple arrangement at a low cost.

Further, as a feature of the weighted-average circuit, as shown in the above-mentioned equation (1), the data Db,n of the black reference level for the current line is affected by the average Dopb,n for the current line most greatly. Thereby, by using the weighted-average circuit, it is possible that the black shading correction well follows the variation in the black offset level.

In a case where the above-described weighted-average circuit 19 is formed by hardware, the calculation can be performed only by shifting of the register values when the constant A used in the above-mentioned equation (1) is determined to be a power of two (for example, 2, 4, 8 or the like). Thereby, it is possible to simplify the arrangement of the hardware.

Instead of performing the weighted-average calculation as in the first embodiment, it is also possible to perform a moving-average calculation using the average Dopb,n−m for the (n−m)-th line (m-th previous line) through the average Dopb,n for the n-th line (current line). Also in this case, it is possible to reduce the influence due to a bad S/N ratio of the image reading apparatus on the black reference level used for the black shading correction.

Figure 5:
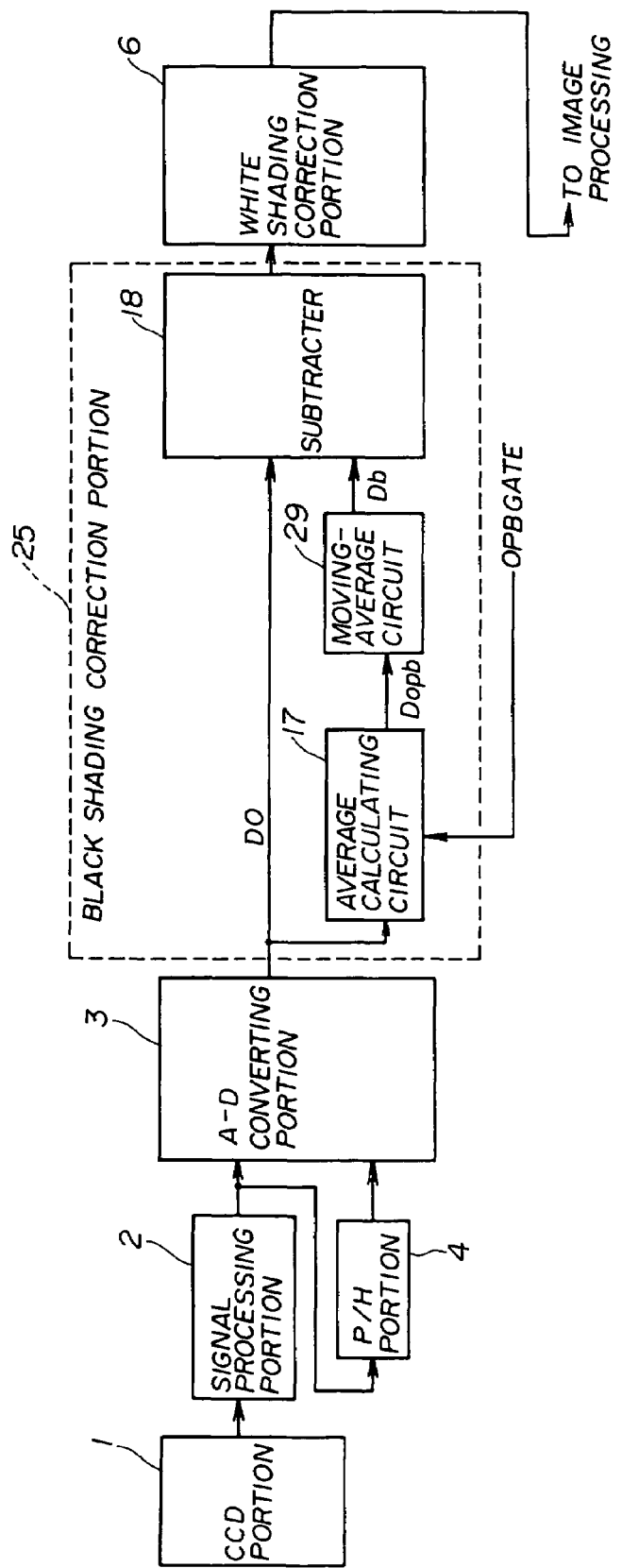
FIG. 5 is a block diagram showing essential portions of an image reading apparatus in the second embodiment of the present invention.

FIG. 5 is a block diagram showing essential portions of an image reading apparatus, in a second embodiment of the present invention, including a black shading correction portion, which performs the black shading correction using the data of the black reference level obtained as a result of performing the above-mentioned moving-average calculation.

As shown in FIG. 5, the image reading apparatus in the second embodiment includes a CCD portion 1 which comprises a CCD including a line of photoelectric sensors extending in the main scan direction, and generates an image signal as a result of reading an original image. The reading of the original image is performed as follows: The CCD portion 1 scans a first line of the original image in the main scan direction along the line of the photoelectric sensors of the CCD (whereby image data of the first line is obtained) and scans the original image in the sub-scan direction (perpendicular to the main scan direction) by sequentially scanning subsequent lines of the original image (whereby image data of respective lines, i.e., a second line, a third line, . . . , an n-th line, is obtained in sequence). The CCD of the CCD portion 1 is the same as the above-described CCD having the OPB portion. The image reading apparatus further includes a signal processing portion 2 which performs processing of an analog image signal outputted from the CCD portion 1, an A-D converting portion 3 which is an A-D converter converting the analog image signal into a digital image signal, a peak hold (P/H) portion 4 for detecting the background level of the original image, a black shading correction portion 25 which performs a black shading correction, using the data of the black reference level, on the image signal, and a white shading correction portion 6 which performs a white shading correction on the image signal.

The arrangement of the image reading apparatus in the second embodiment is the same as the image reading apparatus in the first embodiment shown in FIG. 3, except for the black shading correction portion 25. That is, each of the portions 1, 2, 3, 4 and 6 of the image reading apparatus in the second embodiment is the same as a respective one of the portions 1, 2, 3, 4 and 6 in the first embodiment shown in FIG. 3.

The black shading correction portion 25 includes an average calculating circuit 17 which calculates the average Dopb of the outputs of the CCD portion 1 (obtained via the signal processing portion 2 and A-D converting portion 3) during the period during which the CCD portion 1 obtains data through the photoelectric sensors of the above-mentioned OPB portion of the CCD, a moving-average circuit 29 which performs moving-averaging using values outputted from the average calculating circuit 17, and a subtracter 18 which subtracts the moving average Db thus calculated by the moving-average circuit 19 from the data D0 of the image signal outputted from the A-D converting circuit 3 when the original image is read.

In FIG. 5, the analog image signal outputted by the CCD portion 1 undergoes signal processing by the signal processing portion 2, and, then, is converted into the digital image signal by the A-D converting portion 3. The digital image signal outputted from the A-D converting portion 3 is inputted to the black shading correction portion 25, undergoes the black shading correction therethrough, and, then, is outputted. The image signal outputted from the black shading correction portion 25 is inputted to the white shading correction portion 6. The white shading correction portion 6 performs the white shading correction of the data of the thus-inputted image signal using the white reference data which was obtained using a white reference plate or the like. Then, the image signal is inputted to an image processing block (not shown in the figure).

The average calculating circuit 17 of the black shading correction portion 25 calculates the average of outputs of the OPB portion of the CCD portion 1 (obtained from the CCD portion 1 via the signal processing portion 2 and A-D converting portion 3) before the CCD portion 1 reads the original image, for each line. Then, the average calculating circuit 17 outputs the thus-calculated average Dopb. The moving-average circuit 29, which receives the average Dopb, calculates a moving average Db,n (the average, in the sub-scan direction, of (m+1) averages, each of which averages is the average in the main scan direction) and outputs the moving average Db,n to the subtracter 18. The moving average Db,n is obtained as a result of a moving-average calculation being performed using the average Dopb,n−m for the (n−m)-th line (m-th previous line) through the average Dopb,n for the n-th line (current line). The subtracter 18, which has received the moving average Db,n, subtracts the moving average Db,n from the data D0 of the image signal outputted from the A-D converting portion 3 when the original image is read, and outputs the thus-obtained data to the white shading correction portion 6. The calculation of the average performed by the average calculating circuit 17 is performed only during the period during which the average calculating circuit 17 receives the OPB-GATE signal which is provided to the average calculating circuit 17 only during the period during which the data obtained from the OPB portion of the CCD portion 1 is outputted from the CCD portion 1.

Further, in the arrangement of the second embodiment shown in FIG. 5, as in the first embodiment shown in FIG. 3, the peak hold (P/H) portion 4 is connected between the signal processing portion 2 and the A-D converting portion 3. The peak hold portion 4 holds the peak value of the output from the signal processing portion 2, and provides the peak value to the A-D converting portion 3 as the reference voltage of the A-D converting portion 3. Because the operation of the peak hold circuit 4 in the second embodiment is the same as the operation of the peak hold circuit 4 in the first embodiment shown in FIG. 3, further description is omitted.

As described above, in the black shading correction portion 25 in the second embodiment, the data of the black reference level for eliminating the black offset from the image signal is obtained as a result of performing moving-averaging using the average of the data obtained from the data outputted from the OPB portion of the CCD of the CCD portion 1 for the (n−m)-th line (m-th previous line) through the average of the data obtained from the data outputted from the OPB portion of the CCD of the CCD portion 1 for the n-th line (current line). In this case, the moving average Db,n is obtained from the following equation (4), for example:

$$Db,n = \Sigma Dopb,x(n-m, n)/(m+1) \quad (4)$$

where:

'Db,n' represents the value of the black reference level (which is subtracted from the data D0 of the image signal through the subtracter 18) for the n-th line;

'ΣDopb,x (n−m, n)' represents the sum of the Dopb,x for x=n−m through n, that is, the sum of Dopb,n−m through Dopb,n; and 'Dopb,x' represents the average or a weighted average of the data obtained from the data outputted from the OPB portion for the x-th line (that is, the average or a weighted average of the data of the image signal outputted from the A-D converting portion 3 during the period during which the data obtained from the OPB portion of the CCD portion 1 is outputted from the CCD portion 1 before the original image is read for the x-th line).

However, when $1 < n \leq m$, $$Db,n = \Sigma Dopb,x(1, n)/n$$

where 'ΣDopb,x (1, n)' represents the sum of the Dopb,x for x=1 through n, that is, the sum of Dopb,1 through Dopb,n.

When n=1,

Db,1=Dopb,1

Figure 6:
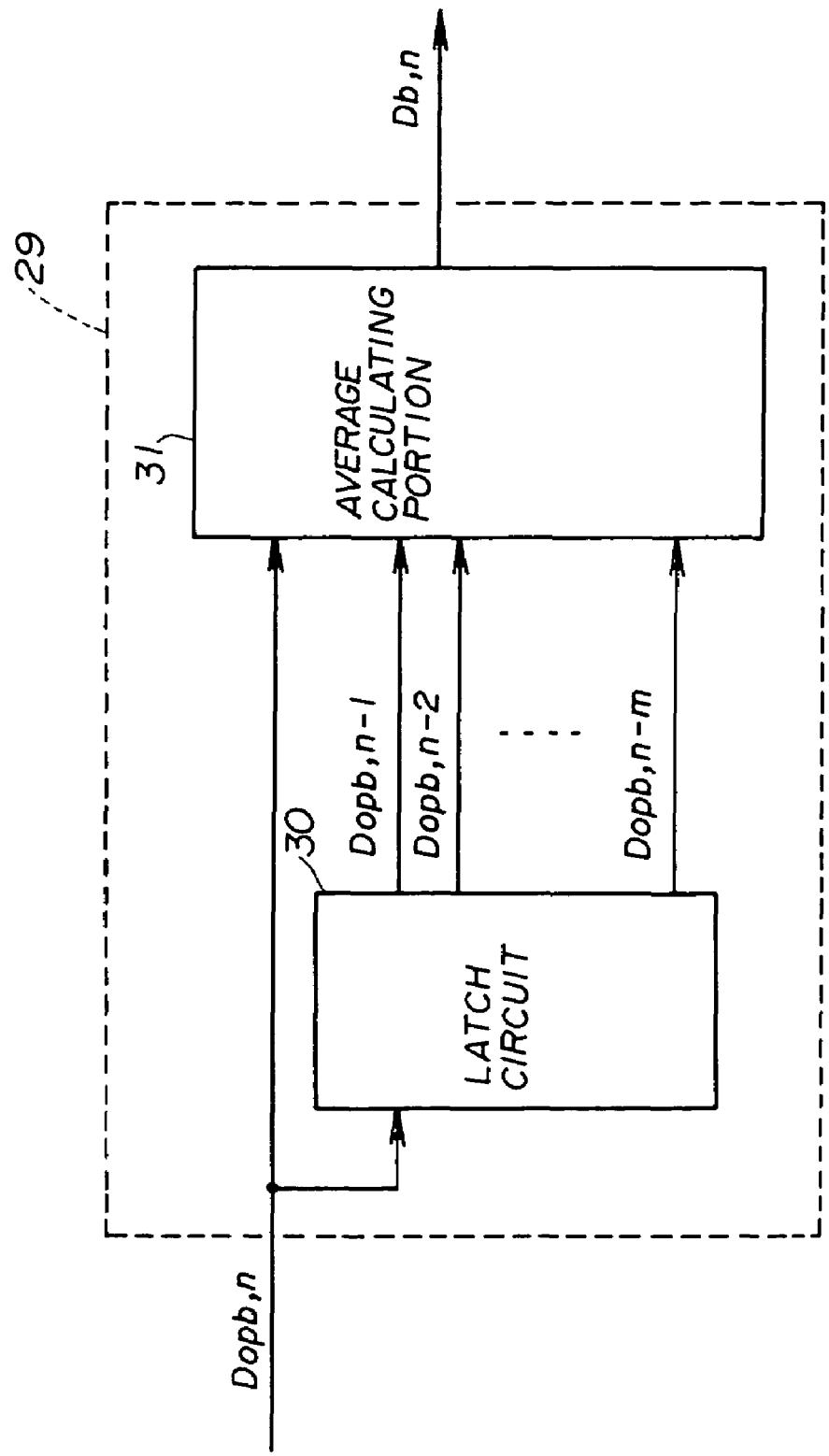
FIG. 6 is a block diagram showing an internal arrangement of a black shading correction portion shown in FIG. 5.

FIG. 6 is a block diagram showing the internal arrangement of the moving-average circuit 29.

As shown in FIG. 6, the moving-average circuit 29 includes a latch circuit 30 which latches the average Dopb,n−m for the (n−m)-th line through the average Dopb,n−1 for the (n−1)-th line, which were already outputted from the average calculating circuit 17 in sequence, and outputs the thus-latched values in parallel. The moving-average circuit 29 further includes an average calculating circuit 31 which calculates the sum of the average Dopb,n for the n-th line (current line), outputted from the average calculating circuit 17 and the average Dopb,n−m for the (n−m)-th line through the average Dopb,n−1 for the (n−1)-th line, outputted from the latch circuit 30. Then, the average calculating circuit 30 divides the thus-obtained sum by (m+1), that is, by the total number of the averages Dopb,n−m through Dopb,n inputted to the average calculating circuit 30.

However, when 1<n<m, the latch circuit 30 latches the average Dopb,1 for the first line through the average Dopb,n−1 for the (n−1)-th line, already outputted from the average calculating circuit 17 in sequence, and outputs the thus-latched values in parallel. The average calculating circuit 31 calculates the sum of the average Dopb,n for the n-th line (current line), outputted from the average calculating circuit 17 and the average Dopb,1 for the first line through the average Dopb,n−1 for the (n−1)-th line, outputted from the latch circuit 30. Then, the average calculating circuit 30 divides the thus-obtained sum by n, that is, by the total number of the averages Dopb,1 through Dopb,n inputted to the average calculating circuit 30.

When n=1, the moving-average portion 29 outputs the inputted average Dopb,1, as it is, as the black reference value Db,1.

When comparing the first embodiment, shown in FIGS. 3 and 4, with the second embodiment, shown in FIGS. 5 and 6, the first embodiment is superior for the following reasons.

In the second embodiment, it is necessary to increase the number (m+1) of the averages Dopb,n−m through Dopb,n (the average Db,n of which averages is used as the data of the black reference level to be subtracted from the data D0 of the image signal in the black shading correction), in order to increase the accuracy of the data of the black reference level used for the black shading correction, that is, in order to increase the accuracy of the value Db,n to be subtracted from the data D0 of the image signal so as to eliminate the black offset from the image signal. For this purpose, a large number of registers are needed, and, as a result, the size of the entire circuit increases. Further, in this case, because the number (m+1) of the averages Dopb,n−m through Dopb,n (the average Db,n of which averages is used as the data of the black reference level) increases, it is not possible that the black shading correction well follows the variation in the black offset level.

In order to enable the black shading correction to well follow the variation in the black offset level, it is necessary to reduce the number (m+1) of the averages Dopb,n−m through Dopb,n (the average Db,n of which averages is used as the data of the black reference level). However, in this case, the accuracy of the data of the black reference level decreases. Thereby, it is not possible to sufficiently reduce the influence due to a bad S/N ratio of the image reading apparatus on the data of the black reference level used for the black shading correction. For example, it is merely possible to reduce the variation due to the noise by a factor of 2 or 3, although it is possible to reduce the variation due to the noise by the factor of A in the first embodiment as shown in the above-mentioned equation (3), where the constant A can be adjusted appropriately.

Thus, although the arrangement, such as that in the second embodiment, in which the data of the black reference level is obtained through the moving-averaging in the sub-scan direction of the averages, each being the average of the pixel values of the OPB portion in the main scan direction, is possible, the arrangement, such as that in the first embodiment, in which the black reference level is obtained through the weighted-averaging in the sub-scan direction of the averages, each being the average of the pixel values of the OPB portion in the main scan direction, is superior.

Thus, as a result of the weighted-average or the moving-average of values, each of the values being data of the shielded portion (OPB portion) of the photoelectric device for a respective line, being used as the data of the black reference level used for the black shading correction, it is possible to control the variation in the level of the image signal for each line due to the variation in the black reference level used for the black shading correction for each line due to noise, and, also, it is possible to enable the black shading correction to well follow the variation in the black offset level of the image signal due to variation in the level of the image signal, for each line.

The present invention is not limited to the above-described embodiments, and variations and modifications may be made without departing from the scope of the present invention.

The present invention is based on Japanese priority application No. 10-296061 filed on Oct. 2, 1998, the entire contents of which are hereby incorporated by reference.

What is claimed is:

1. An image reading apparatus, comprising:

photoelectrically converting means for photoelectrically converting image information obtained from optically reading an original image, line by line, and outputting an image signal, said photoelectrically converting means having optically shielding means provided at a portion thereof; and black shading correcting means for correcting the image signal using a black reference level, said black reference level being obtained from said portion of said photoelectrically converting means for each line during an operation of the reading of the original image, wherein the black reference level used by said black shading correcting means for each line is obtained using black reference values, each of the black reference values being data of said portion of said photoelectrically converting means for a respective one of a plurality of lines, wherein the black reference level is a moving average of averages of the black reference values for the plurality of lines, wherein each black reference value for a respective line is an average of pixel values in a main scan direction, the moving average being obtained from moving-averaging, in a sub-scan direction, the black reference values.

2. The image reading apparatus as claimed in claim 1, wherein:

the moving-averaging comprises averaging data of a predetermined number of immediately antecedent lines, the data of each of the predetermined number of immediately antecedent lines comprising an average taken through a relevant line.

3. An image reading apparatus, comprising:

photoelectrically converting means for photoelectrically converting image information obtained from optically reading an original image, line by line, and outputting an image signal, said photoelectrically converting means having optically shielding means provided at a portion thereof; and black shading correcting means for correcting the image signal using a black reference level, said black reference level being obtained from said portion of said photoelectrically converting means for each line during an operation of the reading of the original image, wherein the black reference level used by said black shading correcting means for each line is obtained using black reference values, each of the black reference values being data of said portion of said photoelectrically converting means for a respective one of a plurality of lines, wherein the black reference level for each line is obtained from moving-averaging averages of the black reference values for the plurality of lines.

4. The image reading apparatus, as claimed in claim 3, wherein the plurality of lines comprise the current line and preceding lines.

5. The image reading apparatus as claimed in claim 3, wherein:
the moving-averaging comprises averaging data of a predetermined number of immediately antecedent lines, the data of each of the predetermined number of immediately antecedent lines comprising an average taken through a relevant line.

6. An image reading apparatus, comprising:
a photoelectric unit which photoelectrically converts image information obtained from optically reading an original image, line by line, and outputs an image signal, said photoelectric unit having an optically shielding member provided at a portion thereof; and
a black shading correcting unit which corrects the image signal using a black reference level, said black reference level being obtained from said portion of said photoelectric unit for each line during an operation of the reading of the original image,
wherein the black reference level is obtained using black reference values, each of the black reference values being data of said portion of said photoelectrically converting means for a respective one of the plurality of lines,
wherein the black reference level is a moving average of averages of the black reference values for the plurality of lines,
wherein the black reference value for a respective line is an average of pixel values in a main scan direction, the moving average being obtained from moving-averaging, in a sub-scan direction, the black reference values.

7. The image reading apparatus as claimed in claim 6, wherein:
the moving-averaging comprises averaging data of a predetermined number of immediately antecedent lines, the data of each of the predetermined number of immediately antecedent lines comprising an average taken through a relevant line.

8. An image reading apparatus, comprising:
a photoelectric unit which photoelectrically converts image information obtained from optically reading an original image, line by line, and outputs an image signal, said photoelectric unit having an optically shielding member provided at a portion thereof; and
a black shading correcting unit which corrects the image signal using a black reference level, said black reference level being obtained from said portion of said photoelectric unit for each line during an operation of the reading of the original image,
wherein the black reference level is obtained using black reference values, each of the black reference values being data of said portion of said photoelectrically converting means for a respective one of the plurality of lines,
wherein the black reference level for each line is obtained from moving-averaging averages of the black reference values for the plurality of lines.

9. The image reading apparatus, as claimed in claim 8, wherein the plurality of lines comprise the current line and preceding lines.

10. The image reading apparatus as claimed in claim 8, wherein:
the moving-averaging comprises averaging data of a predetermined number of immediately antecedent lines, the data of each of the predetermined number of immediately antecedent lines comprising an average taken through a relevant line.

* * * * *